United States Patent
De Bie et al.

(10) Patent No.: US 11,368,208 B2
(45) Date of Patent: Jun. 21, 2022

(54) SATELLITE COMMUNICATION TRANSMITTER

(71) Applicant: ST ENGINEERING IDIRECT (EUROPE) CY NV, Sint-Niklaas (BE)

(72) Inventors: Ulrik De Bie, Beveren (BE); Dirk Breynaert, Sint-Niklaas (BE); Dimitrios Christopoulos, Antwerp (BE)

(73) Assignee: ST ENGINEERING IDIRECT (EUROPE) CY NV, Sint-Niklaas (BE)

( * ) Notice: Subject to any disclaimer, the term of this patent is extended or adjusted under 35 U.S.C. 154(b) by 0 days.

(21) Appl. No.: 17/263,688

(22) PCT Filed: Jul. 2, 2019

(86) PCT No.: PCT/EP2019/067776
§ 371 (c)(1),
(2) Date: Jan. 27, 2021

(87) PCT Pub. No.: WO2020/025240
PCT Pub. Date: Feb. 6, 2020

(65) Prior Publication Data
US 2021/0297148 A1  Sep. 23, 2021

Related U.S. Application Data

(60) Provisional application No. 62/712,295, filed on Jul. 31, 2018.

(51) Int. Cl.
*H04B 7/06* (2006.01)
*H04B 7/08* (2006.01)
(Continued)

(52) U.S. Cl.
CPC ......... *H04B 7/088* (2013.01); *H04B 7/18513* (2013.01); *H04B 7/18582* (2013.01);
(Continued)

(58) Field of Classification Search
CPC ............ H04B 7/088; H04B 7/18513; H04B 7/18582; H04B 7/18586; H04B 7/18591;
(Continued)

(56) References Cited

U.S. PATENT DOCUMENTS 10,033,509 B2   7/2018 Rainish
10,347,987 B2   7/2019 Hreha et al.
(Continued)

FOREIGN PATENT DOCUMENTS

FR    3049792 A1   10/2017
WO    2008097367 A2   8/2008
(Continued)

OTHER PUBLICATIONS

Fenech et al., "Challenges of a Flexible Satellite Payload on the Payload and Operational Software Tools," 3rd ESA Workshop on Advanced Flexible Telecom Payloads, Mar. 21-24, 2016, 6 Pages.
(Continued)

*Primary Examiner* — Minh Trang T Nguyen
(74) *Attorney, Agent, or Firm* — Workman Nydegger

(57) ABSTRACT

An earth station transmitter device is arranged for generating a set of data to be transmitted to an earth station receiver device of a satellite communication system. The earth station transmitter device comprises: encoding and modulation means for mapping a plurality of baseband frames; physical layer framing means arranged for inserting in front of each frame of encoded and modulated symbols; converter means for converting a super-frame preamble; super-frame generator means arranged to prepend a first subset of capacity units corresponding to the super-frame preamble to a second subset of capacity units of the plurality corresponding to the plurality of physical layer frames.

10 Claims, 4 Drawing Sheets

(51) Int. Cl.
  *H04B 7/185* (2006.01)
  *H04L 5/00* (2006.01)
(52) U.S. Cl.
  CPC ..... *H04B 7/18586* (2013.01); *H04B 7/18591* (2013.01); *H04L 5/0048* (2013.01)
(58) Field of Classification Search
  CPC . H04B 7/18517; H04L 5/0048; H04W 72/046
  See application file for complete search history.

(56) References Cited

U.S. PATENT DOCUMENTS

2010/0128660 A1* 5/2010 Becker .................. H04L 1/0025
    370/316
2018/0006370 A1  1/2018 Hreha et al.

FOREIGN PATENT DOCUMENTS

WO    2018092132 A1    5/2018
WO    2019133175 A1    7/2019

OTHER PUBLICATIONS

Feltrin et al., "Eutelsat QUANTUM-Class Satellite: Beam Hopping," 3rd ESA Workshop on Advanced Flexible Telecom Payloads, Mar. 21-24, 2016, 8 Pages.
International Search Report and Written Opinion from PCT Application No. PCT/EP2019/067776, dated Oct. 10, 2019.

* cited by examiner

SATELLITE COMMUNICATION TRANSMITTER

FIELD OF THE INVENTION

The present invention is generally related to the field of satellite communication systems.

BACKGROUND OF THE INVENTION

Satellite communication services are important in various fields since many decades. Consider for example Internet over satellite for consumers, but also for enterprises (e.g. oil rigs) and government and defense applications.

One-way and two-way communication services are considered. In two-way satellite communication services there is a link from a hub to a terminal, called the forward (FWD) link, and a link from the terminal to the hub, called the return (RTN) link. In a one-way service, only the FWD link is used. A typical satellite two-way communication network is illustrated in FIG. 1. A hub or gateway (1) communicates with a terminal (3) via at least one satellite (2). In such a system, multiple terminals may be covered through a single hub, in which case we refer to the network as a star network. A satellite communication service may contain several hubs. A hub may contain several transmitters and/or receivers, e.g. if the bandwidth needed in the forward link is larger than the bandwidth that can be transmitted from a single transmitter.

The receive terminals to which the traffic can potentially be combined in a single frame, are grouped in a satellite network or satnet. These terminals decode a same carrier at the same time in a same contour. A satnet controller running on a processor or on an ASIC or FPGA is responsible for handling forward and return (also referred to as inbound and outbound) traffic associated to a satnet. Summarizing, the modulator sends frames serially in a physical carrier, which are demodulated by multiple terminals, each requiring a part of or the entire content of the frames.

A satellite communication system is considered wherein in the forward link a satnet controller (e.g. running on a processor on a blade server or running on an FPGA or ASIC) multiplexes data (also referred to as traffic) to a group of terminals in a frame which is then sent to the modulator (e.g. over an Ethernet cable in the case the satnet controller runs on a processor on a blade server, or over physical lanes on an FPGA in the case the controller runs on the FPGA). Such a frame is for example a baseband frame. The two essential components of the satnet processor are referred to as a shaper and an encapsulator. The average speed or rate at which said frame is sent to the modulator, depends on the average rate at which data for this satnet is transmitted over the air (typically equal to a symbol rate of a transmitted carrier or a fraction of that in the case of time slicing, see DVB-S2 Annex M).

In this description reference is made to a symbol rate of the transmitted carrier. That carrier can possibly also be provided with a sharing mechanism, like e.g. time slicing, whereby the symbol rate of a carrier is shared (sliced) in multiple pieces and each of the pieces is used for different satnets.

Data for multiple satellite networks can be transmitted over the air from a single modulator in a serial way (e.g. via time slicing in a single large physical carrier, see DVB-S2 Annex M), in a parallel way (e.g. by transmitting multiple carriers over orthogonal frequencies, whereby those multiple carriers can be present in a single beam or contour illumination), or as a combination of both. Hence, the satnet processor or multiple satnet processors send one or more data streams, belonging to multiple satellite networks, in a serial or parallel way to the modulator.

These baseband frames are then buffered in storage means in the modulator (e.g. in the case of time slicing, to guarantee a minimum time between frames with a same slice number), for example on a field programmable gate array (FPGA) or an application-specific integrated circuit (ASIC or chip). Subsequently each frame is encoded by the modulator to a forward error corrected (FEC) frame (called coding), mapped to a frame of symbols (called modulation), referred to as an XFEC frame. The physical layer framing process inserts known symbols (a header and potentially PLFRAME related pilot symbols) to XFEC frames or inserts dummy frames if no XFEC frames are available at the moment that the baseband shaping and quadrature modulation asks for symbols. The frames at the output of the physical layer framing process are referred to as PLFRAMEs. The PLFRAMEs are then pulse shaped to a baseband waveform by the baseband shaping and converted to an RF signal via the quadrature modulation. Hence, each baseband frame is associated to a modulation and coding (also referred to as modcod). In DVB-S2 and DVB-S2X, the number of coded bits of "normal" frames equals 64800 bits. Thus, the number of bits in a baseband frame, before encoding, depends on the encoding rate, e.g. ⅔. Also, the number of symbols in an encoded mapped baseband frame depends on the number of bits mapped to a single symbol (e.g., 2 bits for QPSK, 3 bits for 8-PSK, 4 bits for 16-APSK constellations, etc.).

As mentioned above, the physical layer framing inserts header and optionally PLFRAME related pilot symbols, which are known symbols and can be used for synchronization at the receiver side. In addition, the header symbols signal the type of frame that follows (e.g. the modulation and coding used).

The satellite can be a bent-pipe satellite, a digital transparent payload satellite, or a regenerative satellite. It can also be any of the previous in combination with a beam hopping satellite. In a bent-pipe satellite the received signal is processed in an analogue way (e.g. filtering, frequency conversion, amplification) with the main purpose to amplify the signal for transmission in the downlink. In a regenerative satellite the received signal is processed in a digital way. More specifically, the received signal is down-converted to baseband, carrier synchronization is performed and the waveform is matched filtered yielding a sequence of digital symbols. Mostly, the symbols are demapped to coded bits which are decoded to yield (in case of successful decoding) a baseband frame.

In static communication satellite payloads, a coverage area is constantly illuminated, even at times when less communication traffic is requested, thereby not efficiently exploiting the available physical resources. Instead, beam hopping satellite payloads (see the papers "Challenges of a flexible satellite payload on the payload and operational software tools", S. Amos et al., 3rd ESA Workshop on Advanced Flexible Telecom Payloads. March 2016, ESA/ESTEC, Noordwijk (NL), and "Eutelsat QUANTUM-class satellite: beam hopping", E. Feltrin et al., 3rd ESA Workshop on Advanced Flexible Telecom Payloads, March 2016, ESA/ESTEC, Noordwijk (NL)) offer the flexibility to dynamically redirect during operation payload resources (i.e. power, frequency, time) to the geographic locations, where receivers are requesting communication traffic at a certain moment in time. Beam hopping in satellite communications aims to increase the flexibility to direct communication traffic to the receivers (i.e. to the contours on earth where the receivers are located) where needed. A single beam hopper in a beam hopping satellite illuminates multiple contours on earth one after another. For example, assume there are three contours C1, C2 and C3. A possible sequence of illumination then is e.g. C1 C1 C2 C3 C2 C1 C3 C3 C1 C2. The sequence is periodically repeated. In this example, receivers in contour C1 get access to more satellite resources than those in contours C2 or C3. This way, flexible satellite resource allocation to contours is possible, which opens a whole range of market opportunities (e.g. sending more traffic to hot spots).

The satellite communication FWD link parameters experienced at the terminal side are variable, for example due to changing weather conditions. Therefore, a particular modcod may not be decodable anymore, for example in case it is raining. In that case a lower encoding rate can be more optimal, as it allows decoding more errors. Based on the inferred link parameters by the receiving earth station (referred to as ACM monitoring), an adaptive coding and modulation (ACM) controller proposes a modcod for the later frames to be sent to said receiving earth station. The new modcod can be different from the previous modcod if the link parameters have changed. The ACM controller can be located in the receiving earth station or near the transmitting earth station and receives as input inferred link parameters from the receiving earth station (e.g. via the return link of a satellite communication network). In fact, the ACM controller output is a series of modcods, one for each receiving earth station. This list of modcods is an input to the shaper and encapsulator. When transmitting over regenerative satellites, the modcod for the uplink is different from the modcod for the downlink, as there is also a demodulator on-board the satellite. The link seen by the satellite receiver, i.e. the uplink, is different from the link seen by the downlink receiver, the receiving earth station.

The physical layer frames sent by the modulator can be of various types, including normal DVB-S2 or DVB-S2X frames or DVB-S2X super-frames (cfr. DVB-S2X Annex E and the description below). In the case of a beam hopping satellite, several prior art documents (see e.g. EP18176340 and references therein) explain that super-frames must be used in the case of beam hopping, such that receivers can lock immediately on the preamble sent when using super-frames.

The DVB-S2X super-frames contain a constant number of transmitted symbols, more specifically 612540 symbols. It is a larger container than a DVB-S2 and DVB-S2X PLFRAME. A PLFRAME consists of an integer number of capacity units (CUs), each containing 90 symbols. A DVB-S2X super-frame also carries an integer multiple of CUs, but many more than a PLFRAME. A super-frame also prepends a pre-amble and inserts super-frame pilots. The DVB-S2X super-frame (SF) has been proposed for the following purposes:
 increase resilience to co-channel interference via super-frame-wide scrambling;
 support of VL-SNR synchronization algorithms by the regular insertion of reference data fields;
 Synchronize transmission across multiple beams thus enabling amongst others beam hopping and precoding.

Different super-frame (SF) flavours have been envisaged to cover different applications. These flavours are called SF formats. Five different formats (referred to in the DVB-S2X standard as format 0, 1, 2, 3 and 4, respectively) have already been defined. Note that it is not possible to have both PLFRAME related pilot symbols and super-frame pilot symbols present in a super-frame. This disclosure is limited to the case where super-frame pilot symbols are inserted, thus no PLFRAME related pilot symbols are inserted.

The five SF formats can briefly be acknowledged as follows:
 Format 0: DVB-S2X but with SF-aligned pilots and including the new VLSNR frame for VL-SNR burst-mode reception
 Format 1: legacy support of DVB-S2 but with SF-aligned pilots
 Format 2 and 3: bundled PLFRAME formats suitable for precoding and beam-hopping applications
 Format 4: flexible multi-purpose format optimized for wideband transmission and large SNR range Format 4 in the DVB-S2X standard supports four different physical layer header protection levels which enable the support of scenarios for very low SNR applications but also high efficiency signalling for the high SNR and high throughput case. The protection level can change on a per super-frame basis. For example, for a terminal experiencing a very low SNR link, the PL header in the PLFRAMES can be spread five times, corresponding to the highest protection level, resulting in a PL header spanning 10 slots of 90 symbols. As the protection level can only be specified on a per super-frame basis, all PLFRAMES in the super-frame need to send a PL header spanning 10 slots in the case of the highest protection level. The protection levels are:
 Level 0: Standard protection (size 2 slots) using BPSK modulation and overall code rate 1/10
 Level 1: Robust protection (size 4 slots) using BPSK modulation and spreading 2 leading to an overall code rate 1/20
 Level 2: Very robust protection (size 10 slots) using BPSK modulation and spreading 5 leading to an overall code rate 1/50
 Level 3: High efficiency mode (size 1 slot) using QPSK modulation and overall code rate 1/8.75 due to puncturing In some use cases, there is an interest to shorten the DVB-S2X super-frames. For example, when transmitting a forward carrier to serve multiple terminals in a satnet, in which at least one terminal requires, as it experiences harsh link conditions, very low SNR modcods (such terminal is referred to as a very low SNR terminal) and at least one other terminal has better link conditions. Hence, using the DVB-S2X standard, an entire super-frame with the highest protection level is needed to send data to at least said very low SNR terminal, even if only few bits are requested from this terminal, and even if all other terminals experience an excellent link with the capability to demodulate very efficient modcods. The drawback is that all PL frames will have a 10 slot spanning PL header, which results in too large a overhead for the other terminals with better link conditions. Shortening the super-frame to a shortened super-frame in order to only address the very low SNR terminals in said shortened super-frame would avoid this too large overhead for the other terminals, which can be serviced through a new super-frame with a lower protection level. However, it is not specified in the prior art how this shortening should be done.

As a second example in which super-frame shortening is needed, transmission over a beam hopping satellite is considered. The transmission for the illuminated beam must be sent to the satellite at the time the satellite illuminates this beam. The timing duration of an illumination of a particular beam is referred to as the dwell time. There are two options. In one case the dwell time is shorter than a super-frame duration (e.g. for small symbol rates, whereby it takes a longer time to send 612540 symbols) in which case the need for shortening the super-frame is clear. Alternatively, the dwell time is longer than a super-frame duration. The dwell time is then very likely not an integer multiple of the super-frame duration. More specifically, an example as follows can be considered. Assuming a minimum of one super-frame per hopping slot (HS) and a minimum of four contours per hopper and two slots per contour for resource allocation granularity as explained above, the minimum scheduling frame shall be eight slots long. To guarantee a maximum delay jitter one beam needs to appear in every frame. The worst case distance of reappearance for a beam is therefore 2*8−2=14 slots. Assuming a HS=1.25 msec and aiming at maintaining the delay jitter below 20 msec, the symbol rate needs to equal 490 Mbaud (=612540 symbols/1.25 msec) which is possible using a 500 MHz transponder and a receiver that can cope with such symbol rate. However, some use cases might not be compatible with such bandwidth (e.g. current aero modems operate at 125 MHz)). Also, satellite operators might wish to lease to customers smaller chunks of bandwidth (e.g. 250 MHz). Hence, there is a need for a solution for such cases.

The current DVB-S2X standard does not foresee a description how to shorten a super-frame. The only shortening methods described in the DVB-S2X standard are the shortening of VL-SNR modcods in section 5.5.2.6: When an LDPC block is shortened, the first $X_s$ information bits shall be set to 0 before encoding, and they will not be transmitted. In WO2014/091271 both DVB-S2 and shortening are mentioned, but the shortening is applied on the receiver during the waveform demodulation.

In summary, there is thus a clear need for shortened super-frames, while maintaining the advantage of super-frames, e.g. for applying precoding and for robust synchronization.

SUMMARY OF THE INVENTION

It is an object of embodiments of the present invention to provide for an earth station transmitter device capable of generating shortened super-frames. It is also an object to provide for a satellite communication system comprising such an earth station transmitter device.

The above objective is accomplished by the solution according to the present invention.

In a first aspect the invention relates to an earth station transmitter device arranged for generating a set of data to be transmitted to an earth station receiver device of a satellite communication system. The earth station transmitter device comprises:
  encoding and modulation means for mapping a plurality of baseband frames, each associated with a modulation and coding type, to a plurality of frames of encoded and modulated symbols,
  physical layer framing means arranged for inserting in front of each frame of encoded and modulated symbols, a physical layer frame header, so obtaining a plurality of physical layer frames,
  converter means for converting a super-frame preamble, said super-frame preamble comprising a start of super-frame and a super-frame format indicator, and that plurality of physical layer frames into a plurality of capacity units, each capacity unit having a length of 90 symbols,
  super-frame generator means arranged to prepend a first subset of capacity units corresponding to said super-frame preamble to a second subset of consecutive capacity units of said plurality corresponding to said plurality of physical layer frames, and to insert a pilot field of 36 super-frame pilot symbols type A in between each pair of consecutive blocks of 16 capacity units of said first and second subsets, thereby obtaining a pilot segment, and arranged to generate a super-frame by collecting a number of said pilot segment, said number being smaller than 415.

The proposed solution indeed allows for shortening of the super-frame length in a way that pilot fields are spread regularly, both within a single super-frame and between consecutive super-frames. Both the super-frame preamble and the physical layer frames are converted into a set of capacity units, which are each 90 symbols long. A pilot field of 36 symbols is then inserted between each two consecutive groups of 16 capacity units. In this way one obtains a concatenation of sets of 16*90+36=1476 symbols forming a pilot segment, wherein one pilot field is present. A super-frame having a length as defined in DVB-S2X contains 612540 symbols, i.e. 415 pilot segments of 1476 symbols. By taking less than 415 pilot segments in a super-frame, a super-frame of shortened length is realized. Using shortened super-frames allows among other things a more efficient use of the protection levels available in super-frame format 4.

In a preferred embodiment the super-frame preamble comprises a super-frame header containing a pointer to the complete first physical layer frame counted in capacity units and a protection level selector. Advantageously the super-frame header further comprises a super-frame pilot ON/OFF selector.

In one embodiment the earth station transmitter device is arranged for adding at most 16 capacity units of the second subset at the end of the super-frame if the super-frame is the last to be transmitted in a dwell time.

Advantageously, the number of pilot fields in the super-frame is a multiple of 5. This allows avoiding the need of symbol padding to maintain constant super-frame size.

In embodiments the earth station transmitter device comprises encapsulation means for generating the plurality of baseband frames.

In embodiments the earth station transmitter device comprises baseband shaping and quadrature modulation means arranged for receiving the super-frame and for modulating symbols of the super-frame on a waveform at a symbol rate, thereby obtaining the signal to be transmitted.

In another aspect the invention relates to a satellite communication system comprising an earth station transmitter device as previously described and a plurality of earth station receiver devices.

Preferably the earth station receiver devices are arranged for detecting said pilot fields in said super-frame and for performing pilot tracking based on said detected pilot fields.

The earth station receiver devices are preferably arranged for detecting the start of super-frame based on the detected pilot fields.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings, wherein like reference numerals refer to like elements in the various figures.

DETAILED DESCRIPTION OF ILLUSTRATIVE EMBODIMENTS

Figure 1:
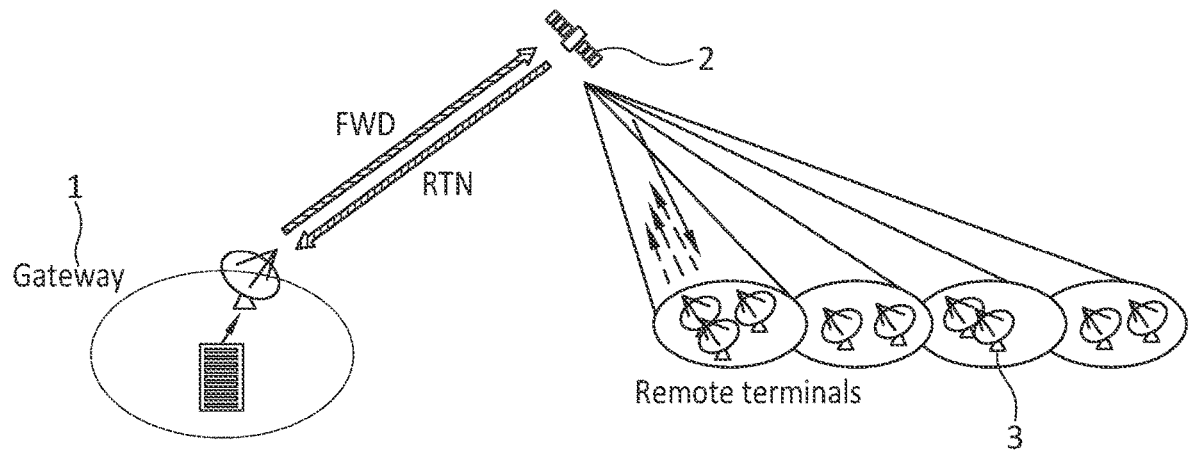
FIG. 1 illustrates a satellite communication system where a hub or gateway (1) communicates with multiple terminals (3) via a satellite (2).

The present invention will be described with respect to particular embodiments and with reference to certain drawings but the invention is not limited thereto but only by the claims.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

It should be noted that the use of particular terminology when describing certain features or aspects of the invention should not be taken to imply that the terminology is being re-defined herein to be restricted to include any specific characteristics of the features or aspects of the invention with which that terminology is associated.

In the description provided herein, numerous specific details are set forth. However, it is understood that embodiments of the invention may be practiced without these specific details. In other instances, well-known methods, structures and techniques have not been shown in detail in order not to obscure an understanding of this description.

DVB-S2X standardization aims at achieving higher efficiencies with the legacy physical layer framing structure (PLFRAME) without introducing fundamental changes to the complexity and structure of DVB-S2. In more detail, the PLFRAME consists of a PLHEADER of 90 symbols (or 180 in case timeslicing is applied) intended for receiver synchronization and physical layer signalling, optionally multiple 36 PLFRAME related pilot blocks and a single FEC. By fixing the number of coded bits to 64800 for normal frames, 32400 for medium frames and 16200 bits for short frames, the PLFRAME is characterized by a time duration which depends on the presence of PLFRAME related pilots, on the selected modulation format and on the symbol rate. Since the transmission of PLFRAME related pilot symbols is not regular in time over different PLFRAMEs, the receiver needs to keep continuous frame processing (i.e. continuously decoding each PL header (PLH), discovering the number of symbols carried by the present frame and then looking for the next header after the recovered number of symbols) in order to maintain framing lock. Practically, this means that by decoding one PLFRAME header, the receiver looks for the next PL frame header after a number of symbols determined by the symbol length of the current frame. Despite the efficiency of such an approach in a continuous operation mode, complications arise once a frame is lost and re-acquisition is to be performed. As already mentioned in the background section, such conditions arise for example in very low SNR conditions (e.g. small aperture terminals such as mobile terminals etc.) and in beam hopping satellites, where the beams are not constantly illuminated.

The need for low-cost burst receivers that manage to lock on a single frame on the one hand, and on the other hand the introduction of beam hopping, where a receiver is not always illuminated and where it is required to lock on the first frame once illumination starts, has led to the definition of a more rigid transmission structure. Such a more rigid transmission structure aims at mitigating the implementation complexity burden of a non-continuous lock system to the transmit side. In order to lock on just one frame, even in low SNR conditions, a header with a longer length was needed. In order not to jeopardize the PHY layer efficiency, one needs to make sure these long headers are not transmitted in a too frequent manner (in order not to create too much overhead). As a result, a larger container, namely the super-frame (SF), was defined.

In short, the super-framing structure brings along the following enhancements. The super-frames consist of a constant number of transmitted symbols, more specifically 612540 symbols, which improves synchronization and tracking. This for example allows "aligning" different super-frames and consequently also pilot sequences over multiple carriers with the same symbol rate, which can be useful for example for precoding. More specifically, this alignment allows for interference management either by correlating at the receiver side with orthogonal sequences included as super-frame pilot symbols, e.g. Walsh Hadamard sequences, or via precoding at the transmitter side.

The SF has a long (720 symbols) header, which greatly facilitates reacquisition if a SF is lost. There is also a regular super-frame pilot field distribution. More precisely, each SF consists of exactly 612540 physical layer symbols that are split among the following fields:

Start of SF (SOSF) composed of 270 symbols containing a known sequence, chosen from a set of orthogonal Walsh-Hadamard sequences, to be used to detect the SF and to mark the start of the SF; the SOSF is the equivalent of the Start-of-Frame (SOF) for the PL frame SF format indicator (SFFI) that consists of 450 symbols, embedding four bits of signalling information (heavily encoded and spread to 450 symbols in total) that is used to identify 16 distinct SF formats;

A common data/signalling field of 611820 data and super-frame pilot symbols that can be allocated in several different ways to the actual DVB-S2(X) PL frames according to the SFFI;

The SOSF and SFFI for the SF represent the equivalent of the PL frame header for the PL frame. In format 4 a format specific SF header reveals the position of the first PL header inside the SF. The remaining PLHs need to be calculated. So constant tracking inside the SF is necessary. The SOSF and SFFI are always decoded. However, based on the SOSF or/and SFFI, a receiver may choose to decode or not the rest of the SF. When discarding SFs which were not selected to be decoded, a receiver can still stay in lock without spending valuable resources on decoding unnecessary information.

DVB-S2X explains how, given the fixed super-frame length of in total 612540 symbols, Super-Frame-aligned Pilots (SF-Pilots) can be defined that are placed in reference to the super-frame structure, whereas in e.g. DVB-S2, PLFRAME related pilots are defined in reference to the PLFrame. The SF pilot patterns and positions can be chosen such that the following condition 1 and condition 2 are met:

Condition1: super-frame pilots are inserted in a regular way in the super-frame. This also holds between consecutive super-frames, i.e. super-frame pilot fields will be repeated periodically across all super-frames (more specifically, there is a constant distance in symbols between two consecutive pilot fields across the entire carrier)

Condition2: no symbol padding is required to maintain constant super-frame size, irrespective of the presence or absence of SF-pilots (ON or OFF).

Several suggestions are provided in the standard to fulfil these conditions with as parameters a SF-Pilot field distance $d_{SF}$ and a SF-Pilot field length $P_{SF}$, where a SF-Pilot field is a sequence of pilot symbols. The SF-Pilot field distance $d_{SF}$ is the amount of non-pilot symbols between the start of the superframe and the start of the first SF pilot field the end of a SF pilot field and the start of the following SF pilot field.

The SF-Pilot field length $P_{SF}$ is the number of SF pilot symbols in a SF-Pilot field.

Figure 2:
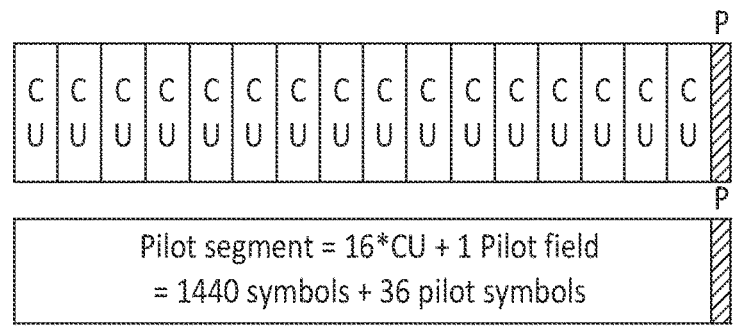
FIG. 2 illustrates a sequence of capacity units CU with one pilot field P.
Figure 3:
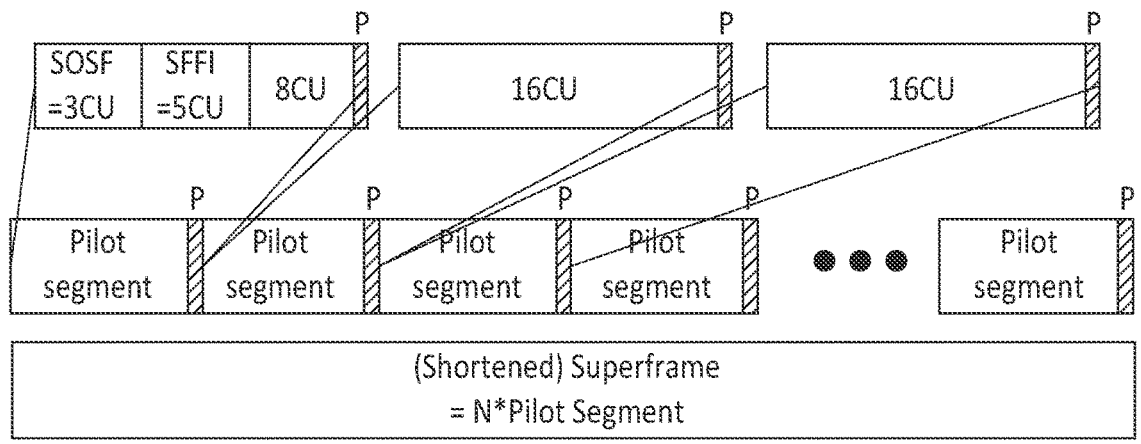
FIG. 3 illustrates the structure of a (shortened) super-frame built with pilot segments and the placement of the SOSF and SFFI fields.

DVB-S2X defines a specific instance of the Super-Frame-aligned Pilots (SF-Pilots) called SF-Pilots Type A. More specifically, the following aspects of SF-Pilots Type A are important in the context of the present invention. A unit with a length of 90 symbols is called a "capacity unit" (CU). The DVB-S2X standard defines the SF Pilot field distance $d_{SF}$ as 16 CU, which thus equals 1440 symbols. Further, the SF-Pilots of type A have a Pilot field size $P_{SF}$=36 symbols. Thus, the SF pilot fields of a length equal to 36 symbols are regularly inserted in between two blocks of 16 CUs comprising other symbols, counting from the start of super-frame including the subset of CUs, formed by the CUs for SOSF/SFFI (8 CUs in total). The regularity of the SF pilot grid also holds from super-frame to super-frame in case pilots remain switched ON by format selection or format-related signalling. FIG. 2 shows a sequence of such 16CU and one pilot field P forming a so-called Pilot Segment. FIG. 3 then shows how the Pilot Segments are combined to a super-frame and how the SOSF/SFFI are placed in this super-frame. The other CU are to be filled in according to the super-frame format specification.

In DVB-S2X, depending on the super-frame format specification several ways are used to signal whether SF-Pilots are in use. For super-frame format specification 0, 1, and 4 the SF-Pilots Type A is in use when it is signalled that SF-Pilots are in use.

In the present invention an alternative way to shorten the super-frame is proposed. A super-frame is thereby selected such that the insertion of SF Pilots Type A still meets Condition1 and, optionally, also meets Condition2.

In order to meet Condition1, the shortening is done by generating a super-frame with a super-frame length in symbols equal to $N*(16*90+36)$, whereby N is an integer number in the range $1 \leq N < 415$. When N is 415, the super-frame length matches with the super-frame length in the DVB-S2X standard, hence it does not involve shortening. It is recalled that the idea behind Condition 1 is to insert a SF pilot field in between two blocks of 16 CUs in order to keep well synchronized to improve the detection of the payload symbols of the second block of 16 CUs. In the special case of beam hopping, the illumination of a receiver stops at the end of the dwell time. Hence, after the last block of 16 CUs, no SF pilot field is required, as there is no need to improve the detection of the coming payload symbols, as there are no payload symbols coming. Instead, as mentioned in EP18176340 for example, a smart pattern of known symbols can be chosen to facilitate the detection of the end of illumination by the receiver. Even stronger, the last payload block does not need to be 16 CUs long, it can be any integer number of CUs smaller than or equal to 16 CUs. Hence, the length of the super-frame sent last in the dwell time can be equal to M*(90)+floor(M/16)*36, with M an integer 1≤M<6640, or M*(90)+floor((M−1)/16)*36.

Figure 4:
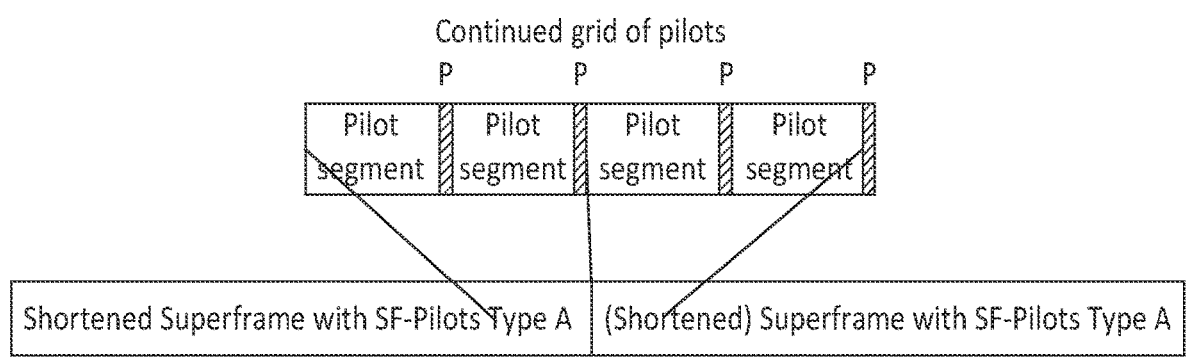
FIG. 4 illustrates the continued grid of pilots.

In order to meet not only Condition1 but also Condition2, the shortening is done by choosing the super-frame length in symbols to be 5*N*(16*90+36) with N an integer number in the range 1≤N<83, except for the last sent super-frame in a dwell time, which can have a length equal to M*(90)+floor (M/16)*36, with M an integer 1≤M<6640, or M*(90)+floor ((M−1)/16)*36. This is because the smallest integer multiple of 36 which is also an integer multiple of 90 equals 180, hence, five pilot fields of 36 symbols are needed to get 180 pilot symbols equivalent to two CUs. As such, a super-frame can be an integer multiple of CUs without padding. FIG. 4 shows how the pilots grid is continued from the shortened super-frame to the next (shortened) super-frame if Condition1 is respected.

Now is illustrated that the use of super-frames with shortened length as proposed in the present invention is beneficial for the symbol rate granularity in the beam hopping example provided at the end of the background section. With the shortened super-frames, a beam hopping satellite with hopping slot HS=1.25 msec can choose a shortening integer N=98 and set the super-frame pilots ON (DVB-S2X related PLFRAME pilots OFF). Then the short SF has a length of N*(16*90+36)=144.648 symbols, leading to lower required Symbol rate=144.648 symbols/1.25 msec=115.718 Mbaud. The finer carrier granularity is achieved as shown in FIG. 5 for a format 4 flavour of the SF.

Figure 5:
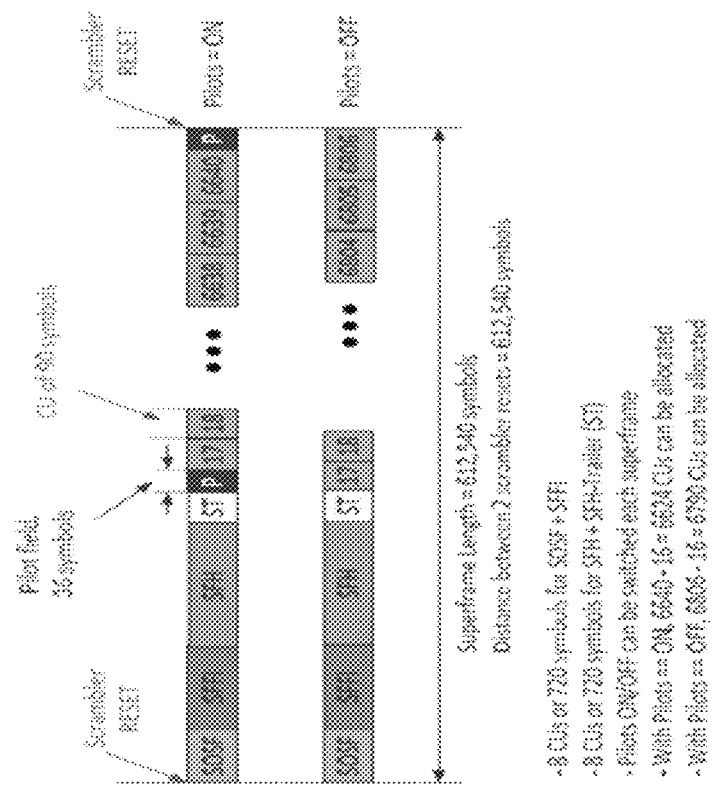
FIG. 5 illustrates the higher resource allocation flexibility obtained for the format 4 flavour by modifications to the DVB-S2X super-frame structure.

FIG. 5 illustrates the use of a super-frame header (SFH) and a SFH-trailer (ST) appended to the SOSF and SFFI blocks. Also the SFH and ST are split into CUs. The SFH comprises 7 CUs with a pointer for the framing, a super-frame pilot ON/OFF selector and a protection level selector. The ST has a length of one CU. The eight CUs of the SOSF and SFFI and the eight CUs of the SFH and ST are then followed by a pilot field. Note that at the end of the super-frame there is a pilot field.

The current DVB-S2X standard already explains what can be done in case there is no integer number of PLFRAMES that fits in a super-frame. More specifically, the last PLFRAME can then be split over two super-frames, where the first part (an integer number of CU) is included at the end of the first super-frame and the second part (also an integer number of CU) is included at the start of the next super-frame for the satnet.

In addition to the proposed structured way of shortening, a system is proposed where the satnet controller maximizes the efficiency by minimizing the overhead. For example, when having terminals in a satnet which require a different protection level, it is of interest to shorten the super-frame with the highest protection level such that the payload of the terminal requiring this protection level is included, but not more. The payload for the other terminals can then be sent by other super-frames with another protection level.

As another example, the beam hopping satellite context is considered. In that case the controller, which is in synch with the beam hopping switching times (e.g. see EP18176340 for explanations how to achieve such synch), can shorten the super-frames such that they fit optimally in the dwell time, in combination with any known symbol pattern transmitted afterwards, required to detect the end of illumination in order to remain in synch.

Figure 6:
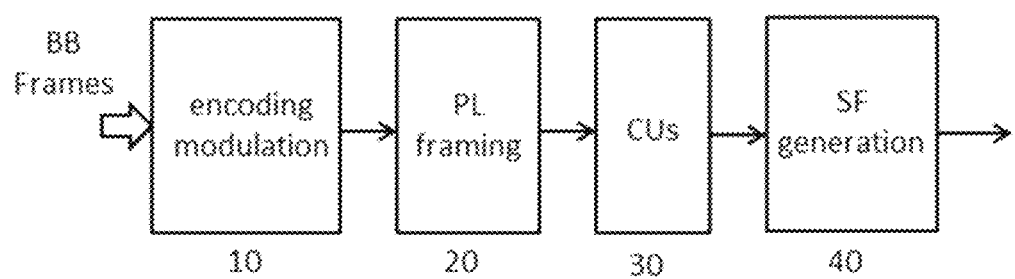
FIG. 6 illustrates a high-level block scheme of an embodiment of the earth station transmitter device according to the present invention.

FIG. 6 illustrates an embodiment of a transmitter according to this invention. The earth station transmitter device comprises:

encoding and modulation means (10) wherein a set of baseband frames, each associated with a modulation and coding type, are mapped frames of encoded and modulated symbols, physical layer framing means (20) to insert in front of each frame of encoded and modulated symbols, a physical layer frame header, whereby a multitude of physical layer frames is obtained, converter means (30) to convert a super-frame preamble, which comprises a start of super-frame (SOSF) and a super-frame format indicator (SFFI), and that multitude of physical layer frames into a plurality of capacity units each having a length of 90 symbols, super-frame generator means (40) to prepend a first subset of capacity units corresponding to the super-frame preamble to a second subset of capacity units of said plurality corresponding to the physical layer frames, and to insert a pilot field of 36 super-frame pilot symbols type A in between each pair of consecutive blocks of 16 capacity units of the subsets, thereby obtaining a pilot segment, and to generate a super-frame by collecting a number of pilot segments, whereby said number is smaller than 415.

In another aspect the invention discloses a satellite communication system comprising an earth station transmitting device and a plurality of earth station receiver devices. The receiver device need to be adapted to process the shortened super-frames transmitted by the earth station transmitting device.

The receiver device first needs to detect a super-frame has been transmitted. This can be achieved by identifying the SOSF. Next, an indication of the super-frame length needs to be found. A receiver device then checks after each detected pilot field whether or not there is a start of super-frame (SOSF) indication. If so, the start of the next super-frame has indeed been found or the end of the preceding super-frame has been reached, if not the SF starting point should occur later in the stream. Once 415 pilot segments have been found the receiver knows the current super-frame has a length as specified in the DVB-S2X standard (see e.g. ETSI EN 302 307-2 v1.1.1). If less than 415 pilot segments are found before a next SOSF is encountered, a shortened super-frame as proposed in this invention is used.

If beam hopping is active, the last CUs of the super-frame at the end of an illumination are filled up with dummy frames of type B, until the end of illumination is reached. The illumination is allowed to stop after the PLH of the dummy frame type B. If several dummy frames of type B are sent, the illumination is allowed to stop after the PLH of the first dummy frame type B.

If beam hopping is active, the receiver device checks at each CU whether there is a PL header of a type B dummy frame. If so, the end of the super-frame is assumed after the PL header of the first dummy frame type B and the length of the super-frame is then known.

In certain embodiments of the receiver device of the satellite communication system, the receiver exploits knowledge of the grid of pilot fields to improve synchronization. A periodic grid of pilot fields allows for a less complex pilot tracking.

While the invention has been illustrated and described in detail in the drawings and foregoing description, such illustration and description are to be considered illustrative or exemplary and not restrictive. The foregoing description details certain embodiments of the invention. It will be appreciated, however, that no matter how detailed the foregoing appears in text, the invention may be practiced in many ways. The invention is not limited to the disclosed embodiments.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. An earth station transmitter device arranged for generating a set of data to be transmitted to an earth station receiver device of a satellite communication system, said earth station transmitter device comprising:
    encoding and modulation means for mapping a plurality of baseband frames, each associated with a modulation and coding type, to a plurality of frames of encoded and modulated symbols,
    physical layer framing means arranged for inserting in front of each frame of encoded and modulated symbols, a physical layer frame header, so obtaining a plurality of physical layer frames,
    converter means for converting a super-frame preamble, said super-frame preamble comprising a start of super-frame (SOSF) and a super-frame format indicator (SFFI), and said plurality of physical layer frames into a plurality of capacity units, each capacity unit having a length of 90 symbols,
    super-frame generator means arranged to prepend a first subset of capacity units corresponding to said super-frame preamble to a second subset of capacity units of said plurality corresponding to said plurality of physical layer frames, and to insert a pilot field of 36 super-frame pilot symbols type A in between each pair of consecutive blocks of 16 capacity units, thereby obtaining a pilot segment, and arranged to generate a super-frame by collecting a number of said pilot segment, said number being smaller than 415.

2. The earth station transmitter device as in claim 1, wherein said super-frame preamble comprises a super-frame header containing a pointer to the complete first physical layer frame counted in capacity units and a protection level selector.

3. The earth station transmitter device as in claim 2, wherein said super-frame header further comprises a super-frame pilot ON/OFF selector.

4. The earth station transmitter device as in claim 1, arranged for adding at most 16 capacity units of said second subset at the end of said super-frame if said super-frame is the last to be transmitted in a dwell time.

5. The earth station transmitter device as in claim 1, whereby the number of pilot fields in said super-frame is a multiple of 5.

6. The earth station transmitter device as in claim 1, comprising encapsulation means for generating said plurality of baseband frames.

7. The earth station transmitter device as in claim 1, comprising baseband shaping and quadrature modulation means arranged for receiving said super-frame and for modulating symbols of said super-frame on a waveform at a symbol rate, thereby obtaining said signal to be transmitted.

8. The satellite communication system comprising an earth station transmitter device as in claim 1 and a plurality of earth station receiver devices.

9. The satellite communication system as in claim 8, wherein said earth station receiver devices are arranged for detecting said pilot fields in said super-frame and for performing pilot tracking based on said detected pilot fields.

10. The satellite communication system as in claim 9, wherein said earth station receiver devices are arranged for detecting said start of super-frame (SOSF) based on said detected pilot fields.

* * * * *